United States Patent [19]
Tachita et al.

[11] 4,368,643
[45] Jan. 18, 1983

[54] ULTRASONIC IMAGING BY RADIAL SCAN BEAMS EMANATING FROM A HYPOTHETICAL POINT LOCATED BEHIND LINEAR TRANSDUCER ARRAY

[75] Inventors: Ryobun Tachita, Kanagawa; Hiroshi Fukukita, Tokyo; Yoshihiro Hayakawa; Kazuyoshi Irioka, both of Sagamihara, all of Japan

[73] Assignee: Matsushita Electric Industrial Company, Limited, Osaka, Japan

[21] Appl. No.: 206,828

[22] Filed: Nov. 14, 1980

[30] Foreign Application Priority Data

Nov. 16, 1979 [JP] Japan ................................ 54-149388

[51] Int. Cl.³ ............................................. G01N 29/00
[52] U.S. Cl. ........................................ 73/626; 73/606; 128/660
[58] Field of Search ..................... 73/626, 625, 606; 128/660; 367/105, 122, 138, 11

[56] References Cited

U.S. PATENT DOCUMENTS

| | | | |
|---|---|---|---|
| 4,159,462 | 1/1979 | Rocha et al. | 73/626 |
| 4,164,213 | 8/1979 | Höelzler | 73/626 |
| 4,204,435 | 5/1980 | Bridoux et al. | 73/626 |
| 4,254,662 | 3/1981 | Kuroda et al. | 73/626 |
| 4,310,907 | 1/1982 | Tachita et al. | 73/626 |

*Primary Examiner*—Stephen A. Kreitman
*Attorney, Agent, or Firm*—Lowe, King, Price & Becker

[57] ABSTRACT

An ultrasonic imaging system includes a linear array of transducers of which a group of successively arranged transducers is selected and successively shifted to the next by at least one transducer. The transducers of the selected group are successively activated at respective delay times to transmit a radial scan beam which appears to emanate from a hypothetical point source located behind the transducer array. A scan converter is provided for conversion of analog echo signals in sector scan format to digital echo data in raster format for visual display.

7 Claims, 7 Drawing Figures

ULTRASONIC IMAGING BY RADIAL SCAN BEAMS EMANATING FROM A HYPOTHETICAL POINT LOCATED BEHIND LINEAR TRANSDUCER ARRAY

BACKGROUND OF THE INVENTION

The present invention relates to sector scan ultrasonic imaging systems, and in particular to a method and system for generating radial scan beams from the transducers of a successively selected group of a linear array as if the beams were emanating from a hypothetical point source located behind the transducer array.

A sector scan ultrasonic imaging system known in the art comprises a linear array of transducers which are successively activated by electrical pulses at times delayed among the various transducers to transmit a radial scan beam. The amount of the delay time is varied successively so that the radial beam is deflected by a predetermined increment to form a sector scan field. Since this sector field has an origin point located on the transducer array, the scanned area near the transducer array is considerably limited.

An attempt which has hitherto been made to overcome this problem involves the use of a water-filled bag between the transducer array and the surface of a body to be scanned. Although this method serves to increase the scanned area of the body, the transmitted beams are reflected at the interface between the water bag and the body. A further disadvantage of this method is that the beam tends to disperse as it propagates through the scanned area of the body with the result that the power of resolution is unsatisfactory.

Another approach which has been proposed combines the sector and linear scan methods by the use of a greater number of transducers arranged in a linear array than is employed in the sector scan type in which a group of successively arranged transducers is selected from the array and shifted by one transducer. The transducers of the groups which are located adjacent to the opposite ends of the array are activated so that they form a sector scan field near each end of the array and the transducers located between them are so activated that the beams are shifted linearly thereacross to form a linear scan field between the sector scan fields. Although this combined method is effective for expanding the scanned area near the transducer array, the scan converter which processes the returned echo signals for visual display would be considerably complicated. Another disadvantage of this method is that discontinuities tend to occur between the linear and sector scan fields.

SUMMARY OF THE INVENTION

The aforesaid prior art disadvantages are eliminated in the present invention by activating the transducers of a successively selected, laterally shifting group of a linear array such that the transmitted beams form a sector scan field of which the origin point is located behind the transducer array. More specifically, the delay times at which the transducers of the selected group are activated are varied so that the beam transmitted from each selected transducer group is made to appear to originate from a hypothetical point located behind the transducer array.

Because of the sector field configuration, the radial scan beams have substantially equal tangential increments. This permits the use of a scan converter which converts ultrasonic echo signals received by the successively selected transducer groups in sector scan format to raster format by sampling and converting the input echo signals to digital echo data at rates which vary inversely with the cosine of the angle of the radial scan beams. The digital echo data is read into a random access memory column by column and then read out row by row. An interpolator may be provided to generate additional digital echo data representing interpolations between adjacent ones of the read out data. The original and additional echo data are read into a buffer storage and serially read out advantageously at a constant rate for visual display.

BRIEF DESCRIPTION OF THE DRAWINGS

The invention will be further described by way of example with reference to the accompanying drawings, in which.

DETAILED DESCRIPTION

Figure 1:
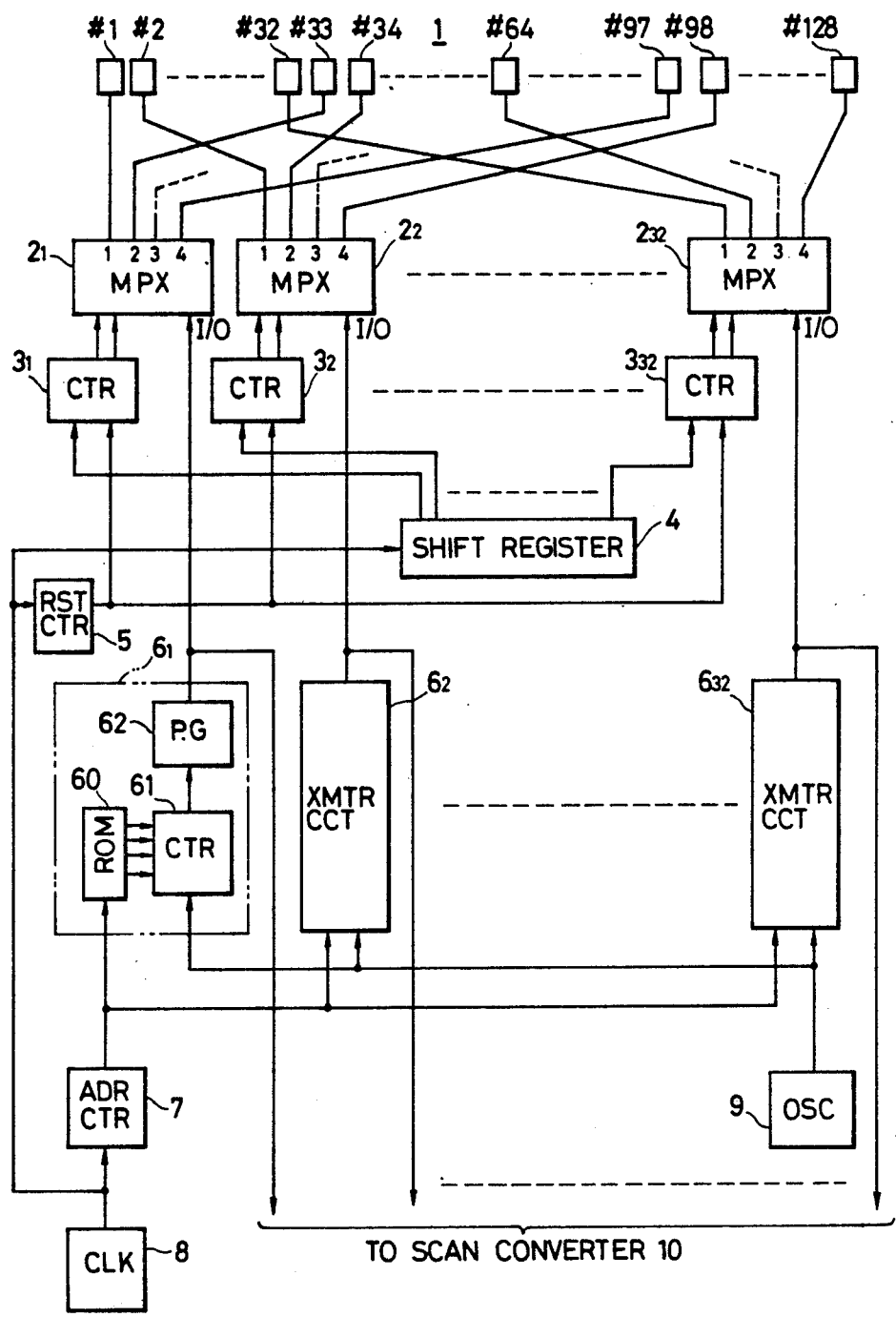
FIG. 1 is a schematic block diagram of an embodiment of the invention illustrating the transmitter section of the sector scan ultrasonic imaging system.

The ultrasonic imaging system of the present invention depicted in FIG. 1 comprises a linear array 1 of equi-distantly spaced apart, piezoelectric transducers No. 1 through No. 128 adapted for transmission of ultrasonic pulses and for reception of echo pulses returned from interfaces between areas of different densities of a subject human body or a material under investigation. A plurality of analog multiplexers or switching networks $2_1$ through $2_{32}$ is provided, each multiplexer having four output terminals which are connected to the individual transducer elements such that the No. 1 output terminals of the multiplexers $2_1$ to $2_{32}$ are connected to the No. 1 to No. 32 transducer elements, respectively; the No. 2 output terminals being respectively connected to the No. 33 to No. 64 elements and so on, so that the No. 4 output terminals are connected to the No. 97 to No. 128 elements, respectively. Counters $3_1$ to $3_{32}$ are provided, which are successively activated in response to a signal from a 32-stage shift register 4 which is generated in response to a clock pulse received from a clock source 8. This clock pulse is generated at a repetition frequency of 3 to 4 kHz depending on the depth of the material or body under investigation. The output signal of the shift register 4 is shifted from the leftmost bit position to the rightmost bit position in response to each clock pulse until the rightmost 32nd bit position is reached in response to a 32nd clock pulse, whereupon the above process is repeated again until all the counters 3 are cleared by a reset signal supplied by a reset counter 5 in response to receipt of a 128th clock pulse.

Responsive to each input signal from the shift register 4, each counter 3 provides an output signal which is a two-bit binary representation of the output terminal of the associated multiplexer which is to be selected. The selected output terminals of each multiplexer is shifted from the No. 1 terminal to the next in response to every 32nd clock pulse. Each multiplexer establishes a connection between an input-output terminal I/O and the selected output terminal. Therefore, for the first 32 clock pulses the No. 1 output terminals of the multiplexers $2_1$ to $3_{32}$ are selected to establish connections to the No. 1 to No. 32 transducers. In response to the occurrence of a 33rd clock pulse counter $3_1$ changes its output state so that the selected output terminal of multiplexer $2_1$ is shifted from the No. 1 to No. 2 to thereby establish a connection to the No. 33 transducer, whereby a successive group of the No. 2 to No. 33 transducers is selected simultaneously. Therefore, in response to a 128th clock pulse, the No. 4 output terminals of the multiplexers $2_1$ to $2_{32}$ are simultaneously connected to the No. 97 to No. 128 transducers, respectively. It is thus seen that a group of successively arranged 32 transducer elements is simultaneously selected and shifted to the next group by one transducer element is response to each clock pulse.

Transmitter circuits $6_1$ to $6_{32}$ are connected to the input-output terminals I/O of the multiplexers $2_1$ to $2_{32}$, respectively. As illustrated in a broken-line rectangle $6_1$, each transmitter circuit includes a read only memory 60, a programmable counter 61 and a pulse generator 62. The programmable counter 62 is preset to the output of the read only memory 60 which is generated in response to an address code supplied from an address counter 7 whose input is connected to the clock source 8, so that the data stored in the read only memory is updated in response to each clock pulse. The counter 61 receives its count input from a common oscillator 9 and generates an output when the preset count value is reached. The counter output triggers the pulse generator 62 to generate a transmission pulse which is applied through the established connection to a selected transducer to transmit an ultrasound pulse into the body at a point in time which is delayed by a predetermined value with respect to adjacent transducers. Transducers of a successively selected group are simultaneously activated by transmission pulses supplied from the transmitter circuits $6_1$ to $6_{32}$ and the individual ultrasound pulses are generated at respective times with respect to each other so that they form a main beam which is angulated with respect to the normal to the array 1. In the read only memory 60 is stored a set of different digital delay time datum, each data being retrieved in response to the address counter 7 to update the preset count value of the counter 61 for each angle increment of the main transmitted beam.

Figure 3:
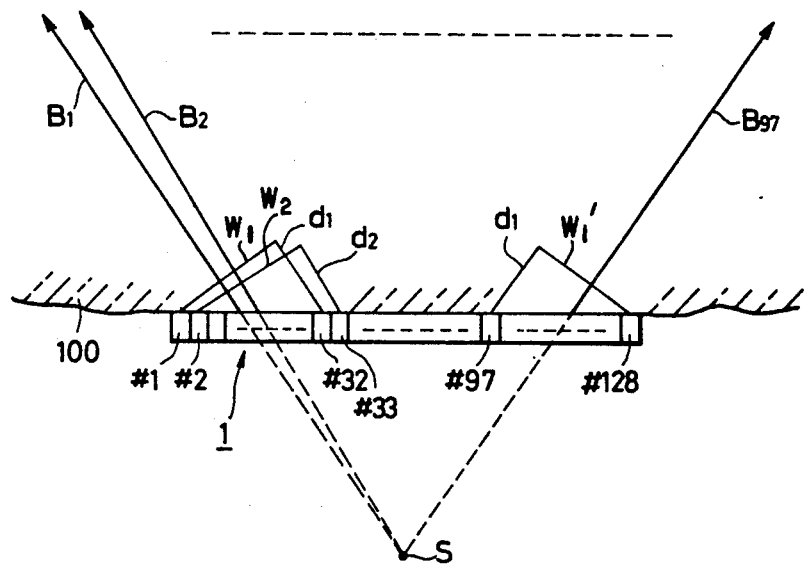
FIG. 3 is a sketch illustrating the sector configuration of ultrasonic beams which appear to radiate from a hypothetical point source located behind the transducer array.
Figure 4:
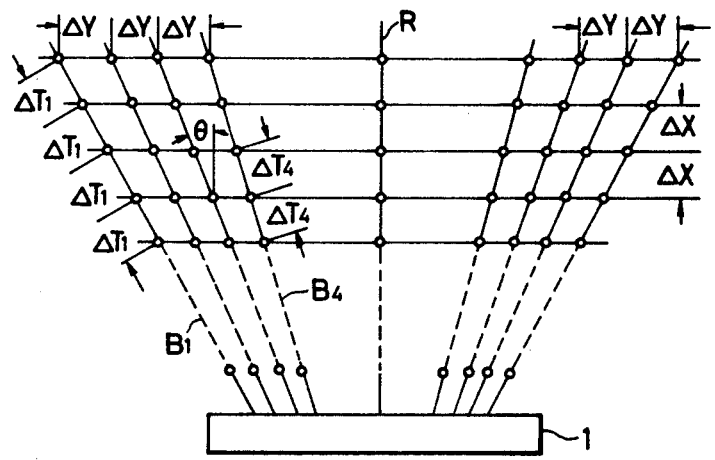
FIG. 4 is an enlarged view of the acoustic scan lines of the sector scan imaging system on which data sample points located on lateral raster lines are shown as circles.

Assuming that a group of Nos. 1 to 32 transducers is selected, the delay time data stored in the read only memories 60 of the transmitter circuits $6_1$ to $6_{32}$ have successively decreasing values in a direction from the transducer No. 1 to No. 32 so that the No. 1 transducer has a maximum delay time $d_1$ with respect to the transducer No. 32 so that during this maximum delay interval the acoustic wave transmitted from the No. 32 transducer has travelled a distance $d_1$ and those transmitted from other transducers of this subarray have travelled leftwardly decreasing amounts of distances forming a wavefront $W_1$ as illustrated in FIG. 3. This causes the transmission of a radial scan beam $B_1$ from the transducers Nos. 1 to 32. In response to the occurrence of a subsequent clock pulse, the No. 2 to No. 33 transducers are selected and the delay time data retrieved from each read only memory has a smaller total delay time than the amounts of delay needed to form the previous beam $B_1$ so that a maximum delay time is given to the No. 2 transducer and during this delay time the acoustic energy emanating from the No. 33 transducer travels a distance $d_2$. As a result, a wavefront $W_2$ is formed generating a beam $B_2$ which is angulated at a smaller angle relative to the normal to the array than the previous beam $B_1$. In like manner, in response to the 128th clock pulse, the No. 97 to No. 128 transducers are selected. The No. 128 transducer is given a maximum delay time so that during this delay time the acoustic energy emanating from the No. 97 transducer has travelled a distance $d_1$ forming a wavefront $W_1'$ so that a radial scan beam $B_{97}$ is transmitted which is angulated by the same amount as beam $B_1$ with respect to the normal to array 1 but on the opposite side thereto. It is to be noted that the delay time data are so predetermined that all the radial scan beams transmitted from the successively selected transducer groups appear to radiate from a single hypothetical point S located behind the transducer array 1. Since all the beams can be regarded as being radiated from a single point source and since all the transducer elements of the array 1 are equally spaced apart, the transmitted beams have substantially equal tangent increments $\Delta Y$ on either side of the normal R of the array 1 as seen in FIG. 4.

It is seen from FIG. 3 therefore that with the transducer array 1 being placed in contact with the surface of the human body 100, a greater area of the inside is scanned that is possible with prior art techniques in which radial scan lines extend from a point located on the transducer array. An advantage of the invention is that since the transmitted beams have equal tangent increments across the full angle of deflection the returned echo pulses can be processed in a scan converter of a simple design.

The transmitted untrasound energy is refelcted from interfaces between different materials or tissues of a human subject with different amplitude and arrives at the transducers at successively delayed intervals prior to the transmission of a subsequent ultrasound beam. The received echo signal are then sampled at an interval inversely proportional to the cosine of the angle of deflection of the beam to the normal R so that the sampled points in the sector scan field align themselves in a direction parallel to the transducer array. As illustrated in FIG. 4, the sampled points indicated by circles are spaced at equal time intervals $\Delta T_1$ along radial scan beam $B_1$ and at equal time intervals $\Delta T_4$ along radial scan beam $B_4$, for example, so that the sampled points are equally spaced apart a distance $\Delta X$ in a direction perpendicular to the transducer array 1.

Figure 2A:
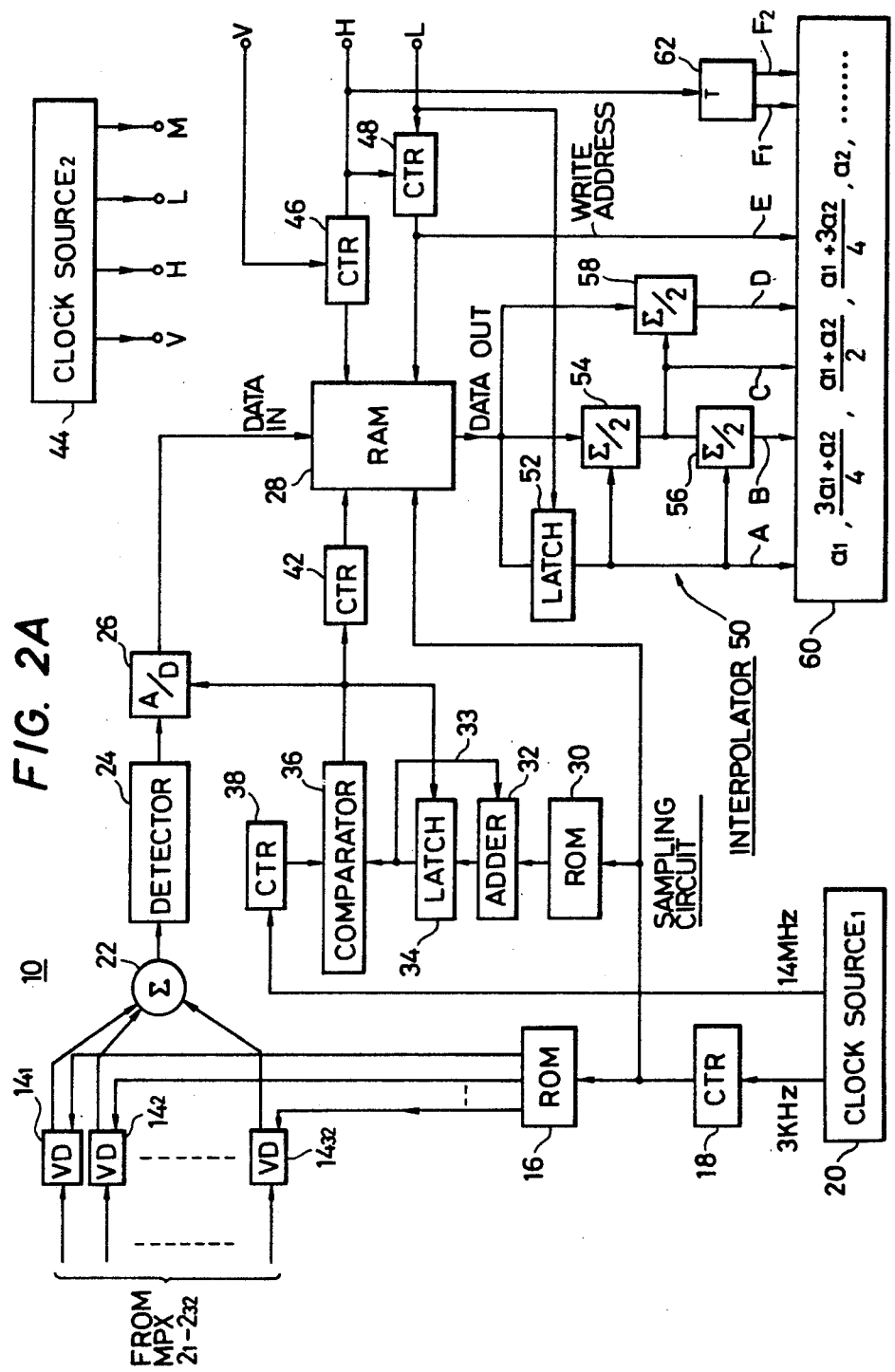
FIGS. 2A and 2B are block diagrams illustrating separately the receiver section of the system.
Figure 2B:
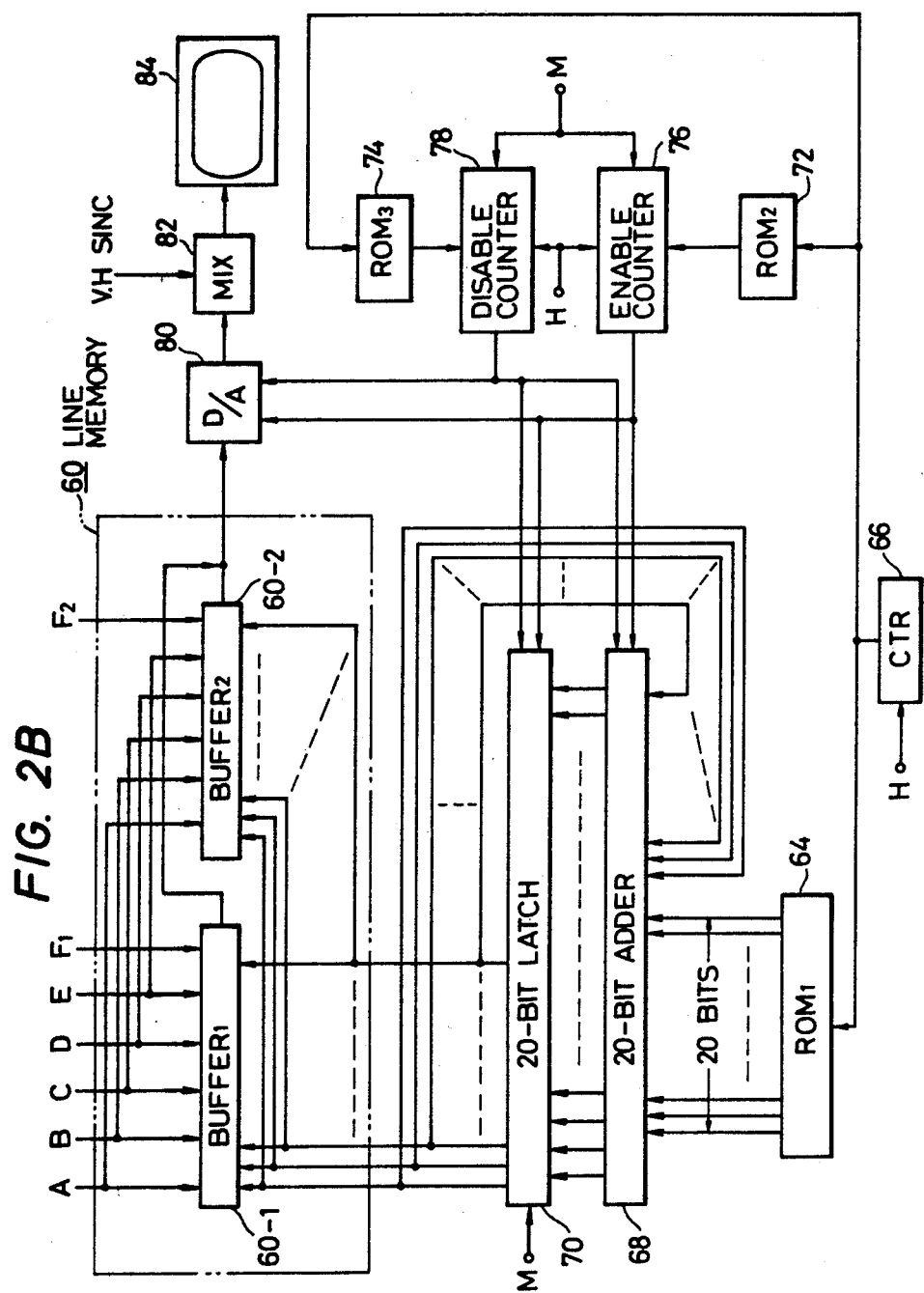

FIGS. 2A and 2B are illustration of the scan converter 10 which is advantageously employed in conjunction with the transmitter of FIG. 1. In FIG. 2A, the scan converter 10 includes a plurality of digital variable delay elements $14_1$ to $14_{32}$ having their inputs connected to the I/O terminals of the multiplexers $2_1$ to $2_{32}$, respectively. The converted electrical pulses are supplied through the multiplexers $2_1$ to $2_{32}$ to the delay elements $14_1$ to $14_{32}$. The delay times of these delay elements are determined by a set of delay time data supplied from a read only memory 16 in response to an address data from an address counter 18 at a clock rate of 3 kHz, for example, supplied from a clock source 20. The effect of these delay elements is to provide a sharp focussing of the transducer array to a desired point.

The echo signals from the delay elements 14 are supplied to an analog adder 22 and thence to a detector 24 where the high frequency components of the combined echo signal are eliminated to detect its envelope. The detector output is coupled to an analog-digital converter 26 to convert the echo signal into digital data representative of the amplitude of the received echo signals, the converted digital data being supplied as an input to a random access memory 28.

Figure 5:
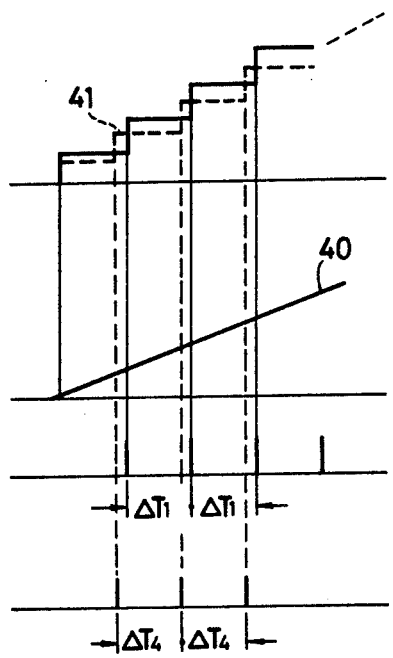
FIG. 5 is a waveform diagram associated with the sampling circuit of FIG. 2A.

The scan converter 10 comprises a sampling circuit formed by a read only memory 30, a digital adder 32, a latching circuit 34, a digital comparator 36 and a binary counter 38. The read only memory 30 is provided with a set of prerecorded sampling data, each datum representing the incremental sampling interval for each of the radial beam. This interval is inversely proportional to the cosine of the angle $\theta$ of the respective deflection with respect to the normal R. Each sampling datum is read out in response to address data from the counter 18 and supplied to a first binary data input of the adder 32. The contents of the adder 32 are transferred to the latch 34 as reference data for the comparator 36 for making a comparison with other data supplied from the counter 38. The latter is a binary representation of the number of clock pulses at 14 MHz, for example, which the counter 38 receives from the clock source 20, so that it varies with an increment of 1 bit in response to the input clock pulse as roughly indicated by a line 40 in FIG. 5. When this time-varying data reaches the reference incremental sampling data $\Delta T_1$, the comparator 36 delivers a coincidence output to the analog-diginal converter 26 and to the latch 34 to cause the latter to transfer its contents to a second binary data input of the adder 32 through a feedback circuit 33 with the result that the predetermined incremental data is accumulated twice in the adder and transferred to the latch to provide a $2\Delta T_1$ data to the comparator 36. Therefore, the sampling data is successively accumulated to generate coincidence outputs from the comparator 36 at equal intervals $\Delta T_1$.

In this way, the echo signals returning along the path of beam $B_1$ are sampled at intervals $\Delta T_1$. When sampling the echo signals along the path of the beam $B_4$, an incremental sampling datum $\Delta T_4$ is read out from the ROM 30 into the adder 32 and the above process is repeated to successively accumulate the data with an increment of $\Delta T_4$, as indicated by broken lines 41 in FIG. 5, and coincidence outputs are generated at intervals of $\Delta T_4$.

The digital echo data from analog-digital converter 26 is written into the RAM 28 column by column in response to a row address from the counter 18 and a column address from a counter 42 provided in response to each coincidence output from the comparator 36. It is thus seen that the sampled data are stored in the cells of RAM 28 as shown in FIG. 4 at the intersections of its column and rows.

The data stored in the RAM 28 are retrieved in response to timing pulses supplied from a second clock source 44. The clock pulse V occurs at intervals corresponding to the vertical synchronization of a cathode ray display unit, the clock pulse H corresponding to the horizontal synchronization. The clock source 44 further generates clock pulses L and M, where the pulse L occurs (1/N)th interval of the horizontal scan period, where N is the total number of ultrasonic beams in the sector field, while the pulse M occurs at a much higher rate than pulses L, the typical value being 14 MHz.

Address counters 46 and 48 receive clock pulses H and L to respectively generate row and column address data for the purpose of reading the data from the RAM 28 in the direction of its rows. Specifically, the data stored in each row are serially retrieved during each horizontal scan period at a constant speed in response to the column address data from the counter 48 and shifted to the next adjacent row in response to the row address data from the counter 46. To clear the binary contents of the counters 46 and 58, clear pulses V and H are respectively applied to the counters 46 and 48.

The data so retrieved in the direction of rows from the RAM 28 are supplied to an interpolator 50 to generate additional echo data representing interpolations between those successively retrieved from the RAM 28. As an exemplary embodiment the interpolator 50 comprises a digital latch 52 and a plurality of digital adders 54, 56 and 58. Each of these adders is designed to perform the function of addition to form the sum of two input binary data impressed upon it and of delivering an output which is the sum of the two input data divided by decimal "2". More specifically, each adder may comprise a number of binary digits for each input data to provide addition and a number of output binary digits which are taken from the upper more significant bits except for the least significant bit.

Assume that when digital echo data $a_1$ and $a_2$ are successively retrieved from the RAM 28, data $a_1$ appears at the output of latch 52 when subsequent data $a_2$ appears at the data output terminal of the RAM 28. The output of the latch 52 is also directly applied to terminal A. The adder 54 provides an output $(a_1+a_2)/2$ to the adder 56 as well as to terminal C. The adder 56 receives its other input from the latch 52 to form an output $(3a_1+a_2)/4$ which is applied to a terminal B to serve as a first interpolation input, the signal supplied to the terminal C serving as a second interpolation input. The adder 58 receives its inputs from the data output terminal of the RAM 28 and from the output of adder 54 to form an output $(a_1+3a_2)/4$ and applies it to a terminal D as a third interpolation input. The latch 52 is responsive to the clock pulse L to update its contents, so that the output data supplied to terminals A to D are updated in response to the delivery of each echo datum from the RAM 28.

The data read out from the interpolator 50 are written into a line memory 60 in response to a write address signal derived from the counter 48 through a terminal E in step with a write enable pulse supplied from a flip-flop 62 which alternately supplies it in response to the clock pulse H through terminals $F_1$ and $F_2$ to the line memory 60.

Figure 6:
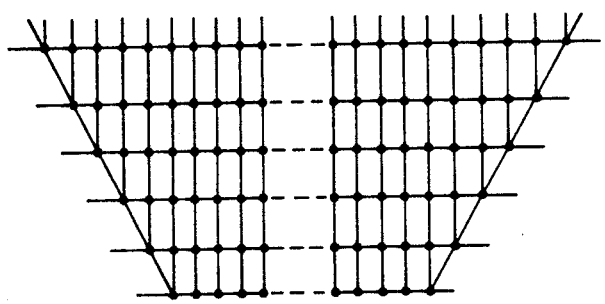
FIG. 6 is an enlarged view of echo data aligned in orthogonal directions in a viewing screen of a display unit.

In FIG. 2B, the line memory 60 is shown in greater detail as comprising a pair of buffer storage devices 60-1 and 60-2. The terminals A to E of the buffer storage devices are connected in multiple to the interpolator outputs, while the terminals $F_1$ and $F_2$ are separately connected to the outputs of the flip-flop 62 so that memories 60-1 and 60-2 are alternately enabled to accept the input data from the interpolator. The reading operation of the line memory 60 is accomplished by means of a circuit comprising a read only memory 64, a digital adder 68 and a latch 70. In the ROM 64 is stored a set of prerecorded incremental address data, each datum representing the data spacing between successive ones of preselected storage locations of the line memory 60 with respect to each raster scan. Each incremental address data, consisting of 20 bits for example, is read out in response to an output from an address counter 66 in synchronism with the horizontal clock pulse H. The adder 68 receives the retrieved incremental address data on a first binary data input and supplies its output to the latch 70 which is enabled in response to the highest rate clock pulse M. The output data from the latch 70 is coupled to the buffer memories 60-1 and 60-2 as well as to a second binary data input of the adder 68 to provide summation of the data supplied to its first and second data input terminals. Therefore, the contents of the adder 68 and hence the latch 70 are updated in response to clock pulses M to generate successively accumulated address data, and the line memory data of preselected storage locations are serially retrieved at a constant speed. The number of the preselected storage locations for each raster scan line is so determined that the data density on each raster scan is approximately equal. Otherwise stated, the data spacing of the raster scan line is varied according to the length of the raster scan across the sector field produced on the display screen. This permits the reproduction echo signals in the display field to appear to align themselves in orthogonal lines, as illustrated in FIG. 6, rather than to appear to align themselves along radially extending lines.

The scan converter 10 further includes read only memories 72 and 74 and disable and enable presettable counters 76 and 78. The ROMs 72 and 74 receive their address data from the counter 66 to preset the count values of the preset counters 76 and 78, respectively. The ROM 72 is provided with a set of data, each representing the distance from a reference point of a vertical line of the display screen to the starting point of each of the horizontal raster scans which form the sector field. Whereas, the ROM 74 is provided with a set of data each representing the length of each raster scan line across the sector field. The preset counters 76 and 78, which are reset to zero in response to clock pulses H, receives clock pulses M to enable the adder 68 and latch 70 in response to the output of the counter 76 and to disable them in response to the output of the counter 78.

The digital output of the line memory 60 is applied to a digital-analog converter 80 where it is converted into analog echo signals during the interval defined by the outputs from the counters 78 and 78 and applied to a mixer 82 where it is mixed with vertical and horizontal synchronization signals to produce a composite video signal for application to a video display unit 84.

What is claimed is:

1. A method of generating radial scan beams of untrasonic waves using a linear array of transducers, comprising the steps of:

selecting one of a plurality of successively arranged overlapping subarrays of transducers from said linear array for connection to a plurality of transmitting and receiving channels;

successively activating the transducers of said selected subarray at times delayed between different transducers to transmit a single scan beam which appears to extend from a hypothetical point source located behind said linear array;

successively shifting the connections to the transmitting and receiving channels from the selected transducer subarray to a next subarray overlapping the first selected subarray by at least one transducer in response to a clock pulse; and varying the amount of said delay times provided to transducers in the next subarray from the delay times provided to transducers in the first selected subarray in response to said clock pulse so that the successively activated transducers of the next subarray transmit a radial scan beam which appears to radiate from said hypothetical point source.

2. A method as claimed in claim 1, further comprising the steps of:

sampling and converting input echo signals received by the transducers of a said selected group to digital amplitude echo data at rates which vary inversely with the cosine of the angle of the radial scan beams, whereby sampling points are along lateral raster lines perpendicular to the normal to said linear array;

writing the digital echo data scan line by scan line into a memory having a matrix of storage cell locations in columns and rows and reading out the stored digital echo data raster line by raster line;

interpolating the read out data to generate additional digital echo data representative of an interpolation between adjacent ones of the read out data and writing the read out data and the additional data into a buffer storage; and serially reading out the data from said buffer storage at a constant rate.

3. An ultrasonic imaging system comprising:

a linear transducer array divisible into partially overlapping multiple subarrays of transducers;

switching means for establishing connections between the transducers of each subarray and a plurality of transmitting and receiving channels and for successively shifting the connections from each subarray to the next by at least one transducer in either direction along the array so that the next subarray overlaps the preceding subarray; and means for controlling the time delays in said transmitting channels by introducing decreasing values of delay as said connections are shifted in a direction toward the normal to said array and for introducing increasing values of delay as said connections are shifted in a direction away from said normal to cause each subarray to transmit a single acoustic beam angulated at such an angle relative to said normal that the acoustic beams transmitted by all of said subarrays are made to appear to originate radially from a single imaginary point behind said array.

4. An ultrasonic imaging system as claimed in claim 3, wherein said controlling means comprises a clock pulse generating source, an address counter for generating an address signal in response to said clock pulse, an oscillator for generating oscillator pulses at a rate higher than the clock pulses, and a plurality of variable delay circuits each comprising a digital memory having predetermined delay time data arranged to be read in response to said address signal, a presettable counter for counting said oscillator pulses in response to the delay time data read out of said digital memory, and a pulse generator for providing an output pulse in response to the output of said presettable counter for application to said switching means.

5. An ultrasonic imaging system as claimed in claim 4, wherein said switching means comprises a plurality of multiplexers each having plural output terminals respectively coupled to predetermined ones of the transducers of said array and an input terminal coupled to receive said output pulse from a corresponding one of said variable delay circuits, a plurality of multiplexer drive counters coupled respectively to said multiplexers for selecting one of the output terminals thereof, a shift register for sequentially counting up said multiplexer drive counters in response to said clock pulse to cause each multiplexer to establish a connection between said input terminal and a selected one of said output terminals.

6. An ultrasonic imaging system as claimed in claim 3, 4 or 5, further comprising a scan converter for conversion of ultrasonic echo signals received by each subarray in sector scan format to raster format, said converter including:

means for sampling and converting the input echo signals to digital echo amplitude data at rates which vary inversely with the cosine of the angle of the radial acoustic beams relative to the normal to said transducer array, whereby sampling points are along lateral raster lines perpendicular to said normal;

a digital memory having a matrix of storage cell locations in columns and rows each corresponding to a sampling point; and means for writing the digital echo data into said memory column by column and reading out the stored echo data row by row.

7. An ultrasonic imaging system as claimed in claim 6, wherein said scan converter further comprises an interpolator for generating additional digital echo data respresentative of interpolations between successively read out data from said digital memory and writing the read out data and said additional data into a buffer storage, and means for serially reading said buffer storage at a constant rate.

* * * * *

UNITED STATES PATENT OFFICE
CERTIFICATE OF CORRECTION

Patent No. 4,368,643                    Dated January 18, 1983

Inventor(s) Ryobun Tachita et al

It is certified that error appears in the above-identified patent and that said Letters Patent are hereby corrected as shown below:

Cover page, Item [75], "Inventors" section, following "Sagamihara", insert --; Tsutomu Yano, Kanagawa; Akira Fukumoto, Tokyo--.

Signed and Sealed this

Fifth Day of April 1983

[SEAL]

Attest:

GERALD J. MOSSINGHOFF

Attesting Officer — Commissioner of Patents and Trademarks